US012738176B2

(12) United States Patent
Wang et al.

(10) Patent No.: US 12,738,176 B2
(45) Date of Patent: Sep. 15, 2026

(54) SYSTEMS AND METHODS FOR TRAINING A SCENE SIMULATOR USING REAL AND SIMULATED AGENT DATA

(71) Applicant: Toyota Research Institute, Inc., Los Altos, CA (US)

(72) Inventors: Tsun-Hsuan Wang, Cambridge, MA (US); Alexander Amini, Brookline, MA (US); Wilko Schwarting, Boston, MA (US); Igor Gilitschenski, Cambridge, MA (US); Sertac Karaman, Cambridge, MA (US); Daniela Rus, Weston, MA (US)

(73) Assignees: Toyota Research Institute, Inc., Los Altos, CA (US); Toyota Jidosha Kabushiki Kaisha, Toyota (JP); Massachusetts Institute of Technology, Cambridge, MA (US)

( * ) Notice: Subject to any disclaimer, the term of this patent is extended or adjusted under 35 U.S.C. 154(b) by 925 days.

(21) Appl. No.: 17/953,894

(22) Filed: Sep. 27, 2022

(65) Prior Publication Data

US 2024/0119857 A1 Apr. 11, 2024

(51) Int. Cl.

*G09B 9/042* (2006.01)
*G06N 20/00* (2019.01)
*G09B 9/05* (2006.01)

(52) U.S. Cl.

CPC ............. *G09B 9/042* (2013.01); *G06N 20/00* (2019.01); *G09B 9/05* (2013.01)

(58) Field of Classification Search

CPC ............ G09B 9/00; G09B 9/042; G09B 9/05; G06N 10/00; G06N 20/00

USPC ............................................................ 701/1

See application file for complete search history.

(56) References Cited

U.S. PATENT DOCUMENTS

| | | | | |
|---|---|---|---|---|
| 10,643,320 | B2 | 5/2020 | Lee et al. | |
| 12,037,013 | B1 * | 7/2024 | Linscott | G06N 20/00 |
| 12,112,259 | B1 * | 10/2024 | Dirac | G06N 3/045 |
| 2016/0314224 | A1 * | 10/2016 | Wei | G05D 1/0088 |
| 2018/0275658 | A1 * | 9/2018 | Iandola | B60R 11/04 |
| 2019/0094875 | A1 * | 3/2019 | Schulter | G06T 7/514 |

(Continued)

OTHER PUBLICATIONS

Chen et al., "GeoSim: Realistic Video Simulation via Geometry-Aware Composition for Self-Driving," Computer Vision Foundation, 2021, p. 7230-7240.

(Continued)

*Primary Examiner* — Hitesh Patel
*Assistant Examiner* — David Mesquiti Ovalle
(74) *Attorney, Agent, or Firm* — Christopher G. Darrow; Darrow Mustafa PC

(57) ABSTRACT

System, methods, and other embodiments described herein relate to training a scene simulator for rendering 2D scenes using data from real and simulated agents. In one embodiment, a method includes acquiring trajectories and three-dimensional (3D) views for multiple agents from observations of real vehicles. The method also includes generating a 3D scene having the multiple agents using the 3D views and information from simulated agents. The method also includes training a scene simulator to render scene projections using the 3D scene. The method also includes outputting a 2D scene having simulated observations for a driving scene using the scene simulator.

20 Claims, 5 Drawing Sheets

(56) References Cited

U.S. PATENT DOCUMENTS

| | | | | |
|---|---|---|---|---|
| 2019/0228571 | A1* | 7/2019 | Atsmon | G01C 21/3815 |
| 2019/0303759 | A1 | 10/2019 | Farabet et al. | |
| 2020/0301799 | A1* | 9/2020 | Manivasagam | G06N 20/00 |
| 2020/0339109 | A1* | 10/2020 | Hong | G06F 11/3698 |
| 2021/0312244 | A1* | 10/2021 | Asa | G06T 11/00 |
| 2022/0135086 | A1* | 5/2022 | Mahjourian | B60W 60/00272 701/23 |
| 2022/0388532 | A1* | 12/2022 | Yangel | G06V 20/56 |
| 2024/0051575 | A1* | 2/2024 | Lee | G06N 7/01 |

OTHER PUBLICATIONS

Liu et al., "Learning End-to-End Multimodal Sensor Policies for Autonomous Navigation," 1st Conference on Robot Learning, 2017, 13 pages.
Xiao et al., "Multimodal End-to-End Autonomous Driving," arXiv:1906.03199v2 [cs.CV], Oct. 25, 2020, pp. 1-10.
Ly et al., "Learning to Drive by Imitation: An Overview of Deep Behavior Cloning Methods," IEEE Transactions on Intelligent Vehicles, vol. 6, No. 2, Jun. 2021, pp. 1-3.
Wymann et al., "TORCS: The Open Racing Car Simulator," Mar. 12, 2015, pp. 1-5.
Codevilla et al., "End-to-end driving via conditional imitation learning," in Proceedings of the International Conference on Robotics and Automation (ICRA), 2018, pp. 4693-4700.
Kendall et al., "Learning to drive in a day," arXiv preprint 1807.00412, 2018, pp. 8248-8254.
Amini et al., "Variational End-to-End Navigation and Localization," in Proceedings of the International Conference on Robotics and Automation (ICRA), 2019, pp. 8958-8964.
Bojarski et al., "End to end learning for self-driving cars," arXiv preprint:1604.07316, 2016, pp. 1-9.
Xu et al., "End-to-end learning of driving models from large-scale video datasets," in Proceedings of the IEEE conference on computer vision and pattern recognition, 2017, pp. 2174-2182.
Hubschneider et al., "Calibrating uncertainty models for steering angle estimation," in 2019 IEEE Intelligent Transportation Systems Conference (ITSC). IEEE, 2019, pp. 1511-1518.
Rhinehart et al., "Deep imitative models for flexible inference, planning, and control," arXiv preprint arXiv:1810.06544, 2018, pp. 1-19.
A. Mehta, "Learning end-to-end autonomous driving using guided auxiliary supervision," in Proceedings of the 11th Indian Conference on Computer Vision, Graphics and Image Processing, 2018, pp. 1-12.
Pan et al., "Virtual to Real Reinforcement Learning for Autonomous Driving," in Proceedings of the British Machine Vision Conference (BMVC), 2017, pp. 1-13.
Bewley et al., "Learning to Drive from Simulation without Real World Labels," in Proceedings of the International Conference on Robotics and Automation (ICRA), 2019, pp. 4818-4824.
Amini et al., "Learning Robust Control Policies for End-to-End Autonomous Driving From Data-Driven Simulation," IEEE Robotics and Automation Letters, vol. 5, No. 2, 2020, pp. 1143-1150.
Unknown, "Bullet Real-Time Physics Simulation" http://pybullet.org, last accessed on Sep. 25, 2022, 9 pages.
Tassa et al., "dm control: Software and tasks for continuous control," arXiv preprint: 2006.12983, 2020, pp. 1-34.
Todorov et al., "MuJoCo: A physics engine for model-based control," in Proceedings of the International Conference on Intelligent Robots and Systems (IROS), 2012, pp. 5026-5033.
Dosovitskiy et al., "Carla: An open urban driving simulator," in Proceedings of the Conference on Robot Learning (CoRL), 2017, pp. 1-16.
Shah et al., "AirSim: High-fidelity visual and physical simulation for autonomous vehicles," in Field and Service Robotics (FSR), 2017, pp. 1-14.
Gan et al., "Threedworld: A platform for interactive multi-modal physical simulation," arXiv preprint arXiv:2007.04954, 2020, pp. 1-23.
Guerra et al., "FlightGoggles: Photorealistic Sensor Simulation for Perception-driven Robotics using Photogrammetry and Virtual Reality," in 2019 IEEE/RSJ International Conference on Intelligent Robots and Systems (IROS), 2019, pp. 6941-6948.
Loquercio et al., "Deep Drone Racing: From Simulation to Reality With Domain Randomization," Transactions on Robotics, vol. 36, No. 1, 2020, pp. 1-14.
Tobin et al., "Domain randomization for transferring deep neural networks from simulation to the real world," in Intelligent Robots and Systems (IROS), 2017 IEEE/RSJ International Conference on. IEEE, 2017, pp. 23-30.
Abu Alhaija et al., "Augmented Reality Meets Computer Vision: Efficient Data Generation for Urban Driving Scenes," International Journal of Computer Vision, vol. 126, No. 9, 2018, pp. 961-972.
Remez et al., "Learning to Segment via Cut-and-Paste," in Proceedings of the European Conference on Computer Vision (ECCV), 2018, pp. 37-52.
Menapace et al., "Playable Video Generation," in Proceedings of the Conference on Computer Vision and Pattern Recognition (CVPR), 2021, pp. 10061-10070.
Li et al., "AADS: Augmented autonomous driving simulation using data-driven algorithms," Science Robotics, vol. 4, No. 28, 2019, pp. 1-12.
Chen et al., "GeoSim: Photorealistic Image Simulation with Geometry-Aware Composition," in Proceedings of the Conference on Computer Vision and Pattern Recognition (CVPR), 2021, pp.
Manivasagam et al., "LiDARsim: Realistic LiDAR Simulation by Leveraging the Real World," in Proceedings of the Conference on Computer Vision and Pattern Recognition (CVPR), 2020, pp. 11167-11176.
Wang et al., "V2VNet: Vehicle-to-Vehicle Communication for Joint Perception and Prediction," in Proceedings of the European Conference on Computer Vision (ECCV), 2020, pp. 605-621.
Xia et al., "Gibson Env: Real-World Perception for Embodied Agents," in Proceedings of the Conference on Computer Vision and Pattern Recognition (CVPR), 2018, pp. 9068-9079.
Savva et al., "Habitat: A Platform for Embodied AI Research," in Proceedings of the International Conference on Computer Vision (ICCV), 2019, pp. 9339-9347.
Deitke et al., "RoboTHOR: An Open Simulation-to-Real Embodied AI Platform," in Proceedings of the Conference on Computer Vision and Pattern Recognition (CVPR), 2020, pp. 3164-3174.
Alcala et al., "Autonomous racing using linear parameter varying-model predictive control (LPV-MPC)," Control Engineering Practice, vol. 95, 2020, pp. 1-8.
Carrau et al., "Efficient implementation of Randomized MPC for miniature race cars," in European Control Conference (ECC), 2016, pp. 957-962.
Galceran et al., "Multipolicy decision-making for autonomous driving via changepoint-based behavior prediction: Theory and experiment," Autonomous Robots, vol. 41, No. 6, 2017, pp. 1367-1382.
Liniger et al., "Real-time control for autonomous racing based on viability theory," IEEE Transactions on Control Systems Technology, vol. 27, No. 2, 2019, pp. 464-478.
Schwarting et al., "Planning and decision-making for autonomous vehicles," Annual Review of Control, Robotics, and Autonomous Systems, 2018, pp. 187-210.
Bansal et al., "ChauffeurNet: Learning to drive by imitating the best and synthesizing the worst," in Proceedings of Robotics: Science and Systems (RSS), 2019, pp. 1-20.
Lechner et al., "Neural circuit policies enabling auditable autonomy," Nature Machine Intelligence, vol. 2, No. 10, pp. 642-652, 2020, pp. 642-652.
Hawke et al., "Urban Driving with Conditional Imitation Learning," in Proceedings of the International Conference on Robotics and Automation (ICRA), 2020, pp. 251-257.
Zhu et al., "Autonomous Robot Navigation Based on Multi-Camera Perception," in Proceedings of the International Conference on Intelligent Robots and Systems (IROS), 2020, pp. 5879-5885.

(56) References Cited

OTHER PUBLICATIONS

Brunnbauer et al., "Model-based versus Model-free Deep Reinforcement Learning for Autonomous Racing Cars," In Proceedings of the International Conference on Robotics and Automation (ICRA), 2021, pp. 1-8.
Sauer et al., "Conditional Affordance Learning for Driving in Urban Environments," in Proceedings of the Conference on Robot Learning (CoRL), 2018, pp. 237-252.
Amini et al., "Variational autoencoder for end-to-end control of autonomous driving with novelty detection and training debiasing," in 2018 IEEE/RSJ International Conference on Intelligent Robots and Systems (IROS). IEEE, 2018, pp. 568-575.
Song et al., "Autonomous Overtaking in Gran Turismo Sport Using Curriculum Reinforcement Learning," in Proceedings of the International Conference on Robotics and Automation (ICRA), 2021, pp. 9403-9409.
Schwarting et al., "Deep Latent Competition: Learning to Race Using Visual Control Policies in Latent Space," in Proceedingss of the Conference on Robot Learning (CoRL), 2020, pp. 1-16.
Toromanoff et al., "End-to-End Model-Free Reinforcement Learning for Urban Driving Using Implicit Affordances," In Proceedings of the Conference on Computer Vision and Pattern Recognition (CVPR), 2020, pp. 7153-7162.
Amini et al., "Vista 2.0: An open, data-driven simulator for multimodal sensing and policy learning for autonomous vehicles," arXiv preprint arXiv:2111.12083, 2021, pp. 2419-2426.
Sofiiuk et al., "Foreground-aware semantic representations for image harmonization," in Proceedings of the IEEE/CVF Winter Conference on Applications of Computer Vision, 2021, pp. 1620-1629.
Schulman et al., "Proximal Policy Optimization Algorithms," arXiv prepring:1707.06347, 2017, pp. 1-12.
Guan et al., "Centralized cooperation for connected and automated vehicles at intersections by proximal policy optimization," IEEE Transactions on Vehicular Technology, vol. 69, No. 11, 2020, pp. 12597-12608.
Bohn et al., "Deep reinforcement learning attitude control of fixed-wing UAVs using proximal policy optimization," in 2019 International Conference on Unmanned Aircraft Systems (ICUAS). IEEE, 2019, pp. 523-533.
Codevilla et al., "On offline evaluation of vision-based driving models," in Proceedings of the European Conference on Computer Vision (ECCV), 2018, pp. 236-251.
Schwarting et al., "Stochastic dynamic games in belief space," arxiv preprint: 1909.06963, 2019, pp. 1-16.
Williams et al., "Autonomous racing with AutoRally vehicles and differential games," arXiv preprint: 1707.04540, 2017, pp. 1-8.
Liniger et al., "A non-cooperative game approach to autonomous racing," IEEE Transactions on Control Systems Technology, vol. 28, No. 3, 2020, pp. 884-897.
Schwarting et al., "Social behavior for autonomous vehicles," Proceedings of the National Academy of Sciences, vol. 116, No. 50, 2019, pp. 24972-24978.
Chen et al., "Learning by cheating," in Conference on Robot Learning (CoRL), 2020, pp. 66-75.
Liang et al., "CIRL: Controllable Imitative Reinforcement Learning for Vision-based Self-driving," in Proceedings of the European Conference on Computer Vision (ECCV), 2018, pp. 584-599.
D.A. Pomerleau, "ALVINN: An autonomous land vehicle in a neural network," in Advances in Neural Information Processing Systems (NeurIPS), 1989, pp. 305-313.
Pfeiffer et al., "From perception to decision: A data-driven approach to end-to-end motion planning for autonomous ground robots," in Proceedings of the International Conference on Robotics and Automation (ICRA), 2017, pp. 1527-1533.
Amini et al., "Learning steering bounds for parallel autonomous systems," in 2018 IEEE International Conference on Robotics and Automation (ICRA), 2018, pp. 4717-4724.
Toromanoff et al., "End to end vehicle lateral control using a single fisheye camera," in Proceedings of the International Conference on Intelligent Robots and Systems (IROS), 2018, pp. 3613-3619.

* cited by examiner

SYSTEMS AND METHODS FOR TRAINING A SCENE SIMULATOR USING REAL AND SIMULATED AGENT DATA

TECHNICAL FIELD

The subject matter described herein relates, in general, to training a scene simulator, and, more particularly, to training the scene simulator for rendering 2D scenes of a driving environment.

BACKGROUND

Vehicles use data from sensors to perceive other vehicles, obstacles, pedestrians, and additional aspects of a surrounding environment. For example, a vehicle uses images from a camera sensor to scan the surrounding environment, while logic associated with the camera sensor detects object presence and other environmental features. Here, a vehicle derives awareness about aspects of the surrounding environment using a trained model. In one approach, systems such as automated driving systems (ADS) use the awareness for computing trajectories to control the vehicle.

In various implementations, systems use simulators that train the ADS. Here, the ADS trains to navigate by executing steering and throttle controls within a simulated scene. However, simulators encounter difficulties acquiring datasets to efficiently train about complex agent (e.g., other vehicles, obstacles, etc.) interactions, volatile lighting, edge cases, and so on. These difficulties impact learning models (e.g., end-to-end learning) for training automated driving and automation tasks within simulated environments. Regarding scene generation, the difficulties cause the simulator to erroneously render darkened or incomplete areas during testing or implementation. Accordingly, simulator performance in environments having multiple agents is hindered from dataset quality and diversity.

SUMMARY

In one embodiment, example systems and methods improve the training of a scene simulator for rendering 2D scenes using data from real and simulated agents (e.g., vehicles). In various implementations, systems simulating scene attributes utilize undiversified datasets for training. For example, a dataset represents a vehicle maneuvering through a typical volume and pattern of traffic. However, the dataset may underrepresent the vehicle merging onto a crowded highway or driving through insufficient lighting (e.g., sparse light posts). As such, a simulator trained with limited datasets causes incomplete scene observations or rendering. Therefore, in one embodiment, a learning system trains a simulator using realistic interactions for rendering scenes having multiple agents (e.g., an ego vehicle, ado vehicles, etc.). In particular, the learning system synthesizes observations from real and simulated vehicles to generate a three-dimensional (3D) scene. As such, training the simulator using these observations and motion dynamics (e.g., agent trajectories) captures edge cases (e.g., disorientation, near collisions, etc.). Furthermore, the realistic interactions may be arbitrary and represent agents as meshed bodies or virtual images from a multi-agent library. In this way, the learning system trains the simulator with a diverse dataset.

In various implementations, a learning model trains using scenes from the simulator for direct vehicle deployment. For example, a reinforcement model has robust policies to control a vehicle autonomously in a driving scenario (e.g., virtual following, virtual overtaking, etc.) using the simulator. The reinforcement model trains the simulator without randomization or fine-tuning, thereby reducing design costs. In particular, the reinforcement model generates awards for smooth control in edge and complex cases having multiple agents. Here, the reinforcement model can factor motion dynamics simulated for the multiple agents. Accordingly, the learning system improves model estimates by training the simulator with a diverse dataset, thereby reducing costs for model implementation.

In one embodiment, a learning system for training a scene simulator to render 2D scenes using data from real and simulated agents is disclosed. The learning system includes a processor and a memory storing instructions that, when executed by the processor, cause the processor to acquire trajectories and three-dimensional (3D) views for multiple agents from observations of real vehicles. The instructions also include instructions to generate a 3D scene having the multiple agents using the 3D views and information from simulated agents. The instructions also include instructions to train a scene simulator to render scene projections using the 3D scene. The instructions also include instructions to output a 2D scene having simulated observations for a driving scene using the scene simulator.

In one embodiment, a non-transitory computer-readable medium for training a scene simulator to render 2D scenes using data from real and simulated agents and including instructions that when executed by a processor cause the processor to perform one or more functions is disclosed. The instructions include instructions to acquire trajectories and three-dimensional (3D) views for multiple agents from observations of real vehicles. The instructions also include instructions to generate a 3D scene having the multiple agents using the 3D views and information from simulated agents. The instructions also include instructions to train a scene simulator to render scene projections using the 3D scene. The instructions also include instructions to output a 2D scene having simulated observations for a driving scene using the scene simulator.

In one embodiment, a method for training a scene simulator to render 2D scenes using data from real and simulated agents is disclosed. In one embodiment, the method includes acquiring trajectories and three-dimensional (3D) views for multiple agents from observations of real vehicles. The method also includes generating a 3D scene having the multiple agents using the 3D views and information from simulated agents. The method also includes training a scene simulator to render scene projections using the 3D scene. The method also includes outputting a 2D scene having simulated observations for a driving scene using the scene simulator.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the training of a scene simulator that renders two-dimensional (2D) scenes using data from real and simulated agents (e.g., vehicles) are disclosed. In various implementations, systems generating simulated scenes involving vehicles train with limited datasets. For example, the datasets have limited details for uncommon scenarios, such as a vehicle maneuvering in a crowded traffic circle. Datasets are particularly limited when uncommon scenarios involve multiple agent interactions (e.g., an urban intersection). Therefore, in one embodiment, a learning system trains a scene simulator using trajectories and three-dimensional (3D) views from real scenarios involving multiple agent interactions. The real scenarios may be observations stored in a dataset acquired from a vehicle fleet. The dataset may be further diversified using information from rural roads, various road curvatures, and abnormal lighting conditions (e.g., glare, shadows, etc.).

Moreover, the learning system leverages the dataset and generates a 3D scene having multiple agents. The 3D scene is generated according to the 3D views and information about simulated agents that improve realism. Furthermore, the learning system trains the scene simulator using the 3D scene and a reinforcement learning (RL) model. Here, the RL model outputs a driving action using simulated observations from a 2D scene generated by the scene simulator. The driving action is associated with a policy (e.g., safe navigation) of the RL model. As such, the RL model computes a reward for the driving action within the 2D scene. For example, the learning system gives a positive award to a simulated vehicle avoiding a hazard during automated mode. The reward may be increased if the vehicle maintains smoothness and comfort during maneuvering. Conversely, the learning system decreases a reward for a collision within the simulated scene.

In various implementations, the learning system iteratively trains the scene simulator by updating states by frame. In particular, simulation states are adapted using calculated rewards and control signals (e.g., steering value, throttle amount, etc.) using the policy for training the scene simulator. Here, adapting the simulation states in the RL model improves frame-by-frame prediction of simulated scenes. Accordingly, the learning system trains a simulator to improve the realistic rendering of simulated scenes involving multi-agent interactions using fleet and library data.

Figure 1:
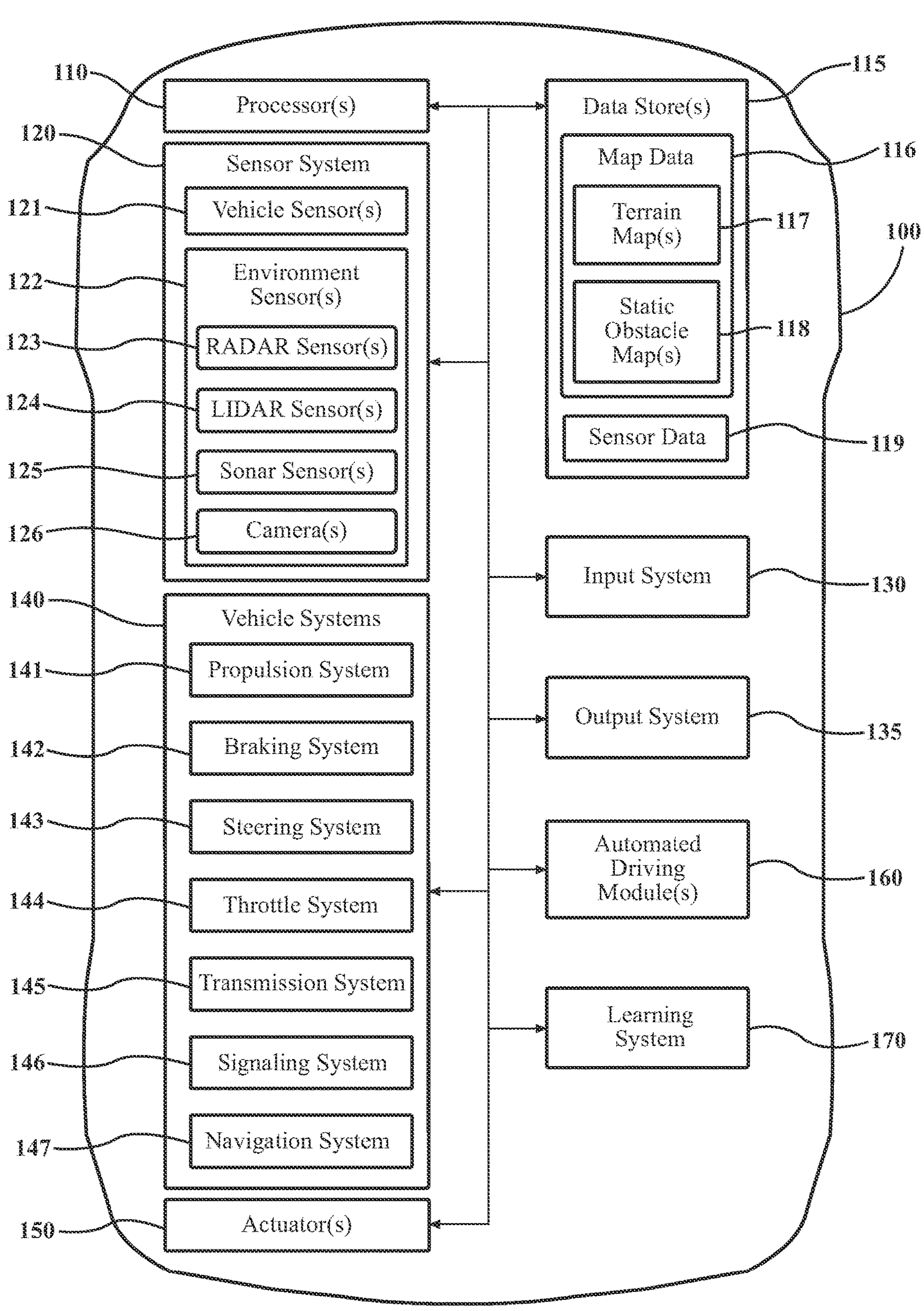
FIG. 1 illustrates one embodiment of a vehicle within which systems and methods disclosed herein may be implemented.

Referring to FIG. 1, an example of a vehicle 100 is illustrated. As used herein, a “vehicle” is any form of motorized transport. In one or more implementations, the vehicle 100 is an automobile. While arrangements will be described herein with respect to automobiles, it will be understood that embodiments are not limited to automobiles. In some implementations, a learning system 170 uses roadside units (RSU), consumer electronics (CE), mobile devices, robots, drones, and so on that benefit from the functionality discussed herein associated with the training and implementation of a scene simulator that renders 2D scenes.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a learning system 170 that is implemented to perform methods and other functions as disclosed herein relating to improving the training and implementation of a scene simulator.

In the examples given for FIGS. 2-5, the learning system 170 trains offline or online using a simulation module 220. For example, offline training involves learning on a server by combining trace data acquired from real vehicles with simulated agents from an image library. Here, a simulator uses a model and data to estimate simulated scenes, with limited real-time data, by limiting losses between frames. As explained below, online training involves the simulator operating using the vehicle 100 to visualize potential collisions between multiple agents in a scene. The collisions are used to improve scene rendering by factoring motion quality (e.g., smoothness) for the vehicle 100.

Figure 2:
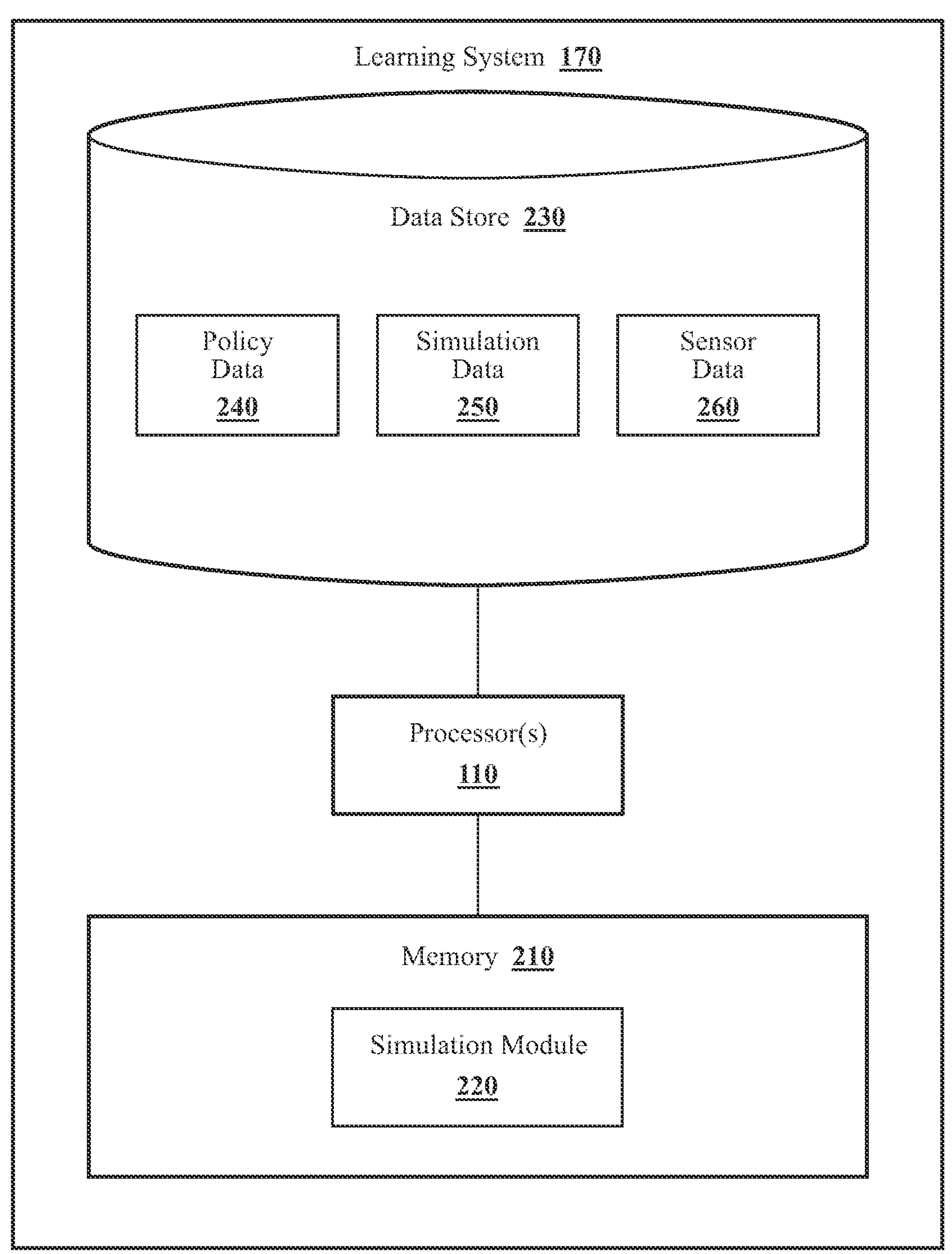
FIG. 2 illustrates one embodiment of a learning system that is associated with training a scene simulator for rendering 2D scenes using data from real and simulated agents.

With reference to FIG. 2, one embodiment of the learning system 170 of FIG. 1 is further illustrated. The learning system 170 is shown as including a processor(s) 110 from the vehicle 100 of FIG. 1. Accordingly, the processor(s) 110 may be a part of the learning system 170, the learning system 170 may include a separate processor from the processor(s) 110 of the vehicle 100, or the learning system 170 may access the processor(s) 110 through a data bus or another communication path. In one embodiment, the learning system 170 includes a memory 210 that stores the simulation module 220. The memory 210 is a random-access memory (RAM), a read-only memory (ROM), a hard-disk drive, a flash memory, or other suitable memory for storing the simulation module 220. The simulation module 220 is, for example, computer-readable instructions that when executed by the processor(s) 110 cause the processor(s) 110 to perform the various functions disclosed herein.

With reference to FIG. 2, the simulation module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. Moreover, in one embodiment, the learning system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the simulation module 220 in executing various functions. In one embodiment, the data store 230 includes the sensor data 260 along with, for example, metadata that characterize various aspects of the sensor data 260. For example, the metadata can include location coordinates (e.g., longitude and latitude), relative map coordinates or tile identifiers, time/date stamps from when the separate sensor data 260 was generated, and so on.

In various implementations, the data store 230 further includes the policy data 240 and the simulation data 250. The policy data 240 may define spacing between vehicles, maneuver ranges, throttle ranges, ranges for steering angles, and so on for the vehicle 100. The simulation data 250 may define component attributes within a driving scene used by the simulation module 220 to render images. For example, components are trees, leaves, bicyclists, roads, signs, and so on within a visual range of the vehicle 100.

Figure 3:
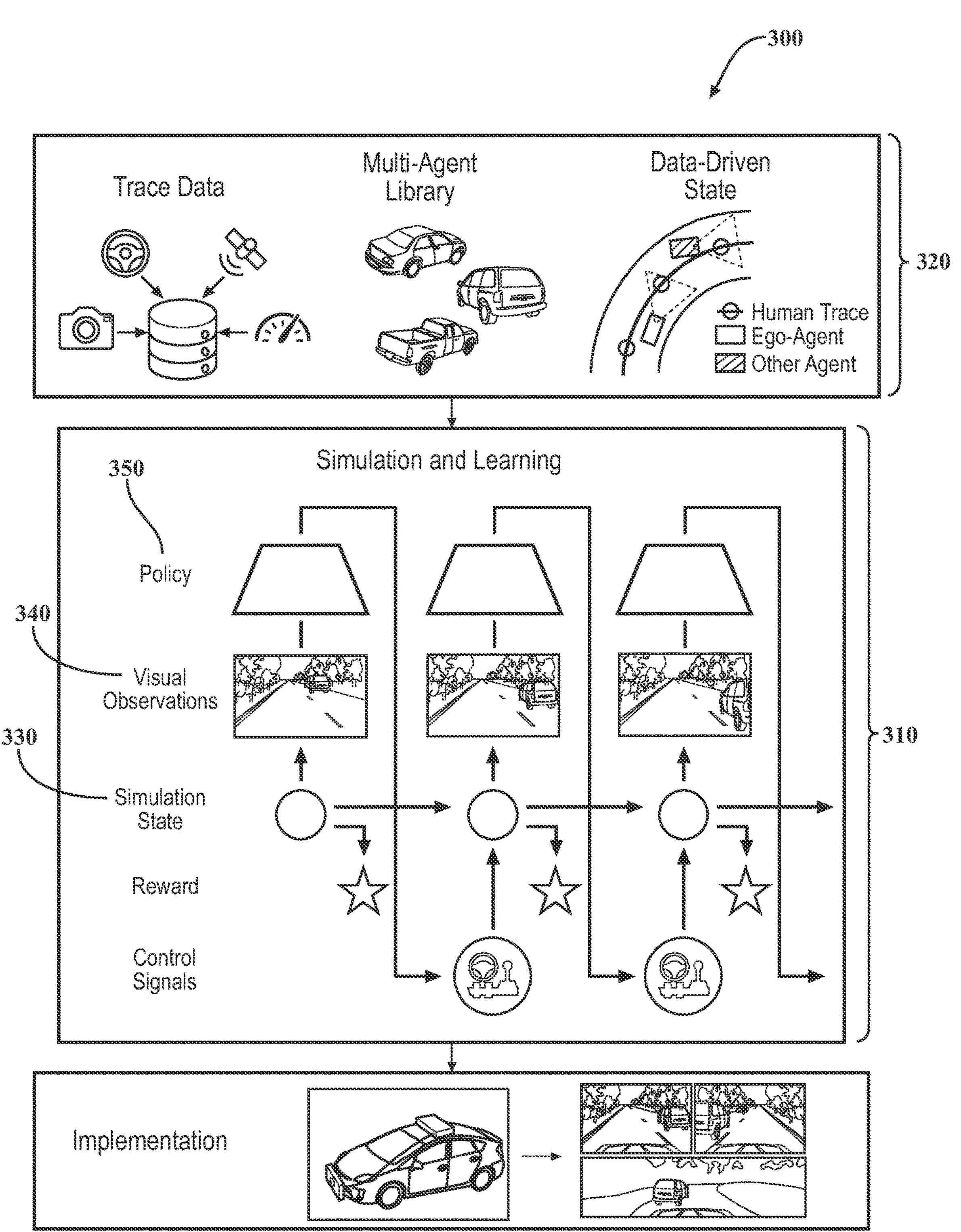
FIG. 3 illustrates one embodiment of a learning system using real data and reinforcement learning (RL) to train a scene simulator.

Turning now to FIG. 3, one embodiment of the learning system 170 using real data and RL to train a scene simulator for realistic multiple agent interactions is illustrated. In various implementations, the simulation model 300 enables zero-shot estimates and avoids complex domain-randomization or style transfer. In zero-shot estimations, a model utilizing the scene simulator makes observations absent from estimates used during training. Furthermore, the simulation model 300 is data-driven such that the simulator generates scenes that are photo-realistic through limited supervised learning and generative video. The photo-realism avoids features of a simulated scene appearing gamified (e.g., block figures). In this way, complex multiple agent interactions are realistically simulated for other learning tasks involving automated driving, object detection, and so on.

In various implementations, the simulation model 300 involves a pipeline that updates agent states and recreates a world. In particular, the world is generated by projecting real-world images to a 3D space using depth information. As explained below, the agents may be meshed in a scene and the simulation model 300 renders viewpoints relative to the agents. Furthermore, the simulation model 300 can post-process in an image space to add lighting and harmonize images using a foreground mask. Such processing improves clarity by reducing artifacts, occlusions, and so on.

In FIG. 3, a simulation and learning stage 310 processes the diversified data 320 to estimate a simulation state 330. The diversified data 320 can include trace data (e.g., real images, steering angles, position, velocity, etc.) from real vehicles in a fleet that encounter multiple agent interactions. Trace data allows training through real videos from a diverse crowd of monocular cameras, stereo cameras, perception sensors, and so on. The trace data provides the learning system 170 trajectory samples from real-world perception. The scene simulator trains using the trace data for synthesizing photo-realistic and semantically accurate local-views frame-by-frame. Here, the multi-agent library includes 2D/3D images of virtual agents associated with multiple agent interactions for filling gaps in the trace data. Furthermore, the simulation state 330 can utilize the simulation data 250 for constructing a simulated scene with increased accuracy. As such, the simulation and learning stage 310 generates the visual observations 340 from the diversified data 320 and the simulation state 330.

Moreover, the visual observations 340 include projected trajectories for multiple agents within a simulated scene using a model for vehicle dynamics. For example, a kinematic model continuously projects trajectories for agents as:

$$\left[\dot{x}, \dot{y}, \dot{\phi}, \dot{\delta}, \dot{v}\right]^T = \left[v \cos \phi, v \sin \phi, \frac{v}{L}\tan \delta, u^{\delta}, u^{a}\right]^T. \qquad \text{Equation (1)}$$

In Equation (1), x, y are vehicle position and Ø heading. Furthermore, δ represents the steering angle, ν the velocity, and L the inter-axle distance. Variables $u^\delta$ and $u^\alpha$ are the steering velocity and acceleration, respectively. In one approach, the learning system 170 uses integration of variable and states through a third-order Runge-Kutta scheme that increases dynamic accuracy in discrete-time. Here, a current state of an agent related to the simulation state 330 is associated with the closest distance from a pose within the trace data.

In one approach, the learning system 170 compensates for transform operations between the diversified data 320 and the agent by leveraging camera extrinsics (e.g., camera location, camera orientation, camera motion, etc.). For example, the learning system 170 during rendering combines the camera extrinsics with depth estimates to compute projections. As such, an image from the data coordinate frame, i.e. the data viewpoint $p_s$, to the viewpoint of an agent $p_t$ can be presented by:

$$p_t = K T_{v_2\to t} T_{v_1\to v_2} T_{s\to v_1} D_s(p_s) K^{-1} p_s, \qquad \text{Equation (2)}$$

$$T_{s\to v_1} = T^{-1}_{v_2\to t}$$

where K are the camera intrinsics (e.g., focal length, aperture, field-of-view, resolution, etc.) and $D_s(p_s)$ data depth at point $p_s$. Furthermore, in Equation (2) $T_{s\to v}$ is the transform from camera to vehicle body. The operator $T_{v_1\to v_2}$ is the transform from the vehicle body data to an agent. Here, the learning system 170 models the transform using the vehicle body $T_{v_1\to v_2}$ to simplify mesh placement in the scene and detecting related collisions. In addition, Equation (2) may involve a yaw difference in $T_{s\to v}$, that induces a bias for left or right placement of a mesh for improving overall agent positioning within the simulated scene.

Moreover, the learning system 170 can represent an agent using a mesh body for a time frame through random sampling. For example, the simulation module 220 samples a library of vehicle meshes that are parameterized according to attributes. The parameterization can improve realism by increasing sampling accuracy. The library can include various vehicle bodies, realistic diffuse color, specular color, specular highlight, metalness, material roughness, and so on. Here, meshing allows flexible positioning of multiple agents within a simulated scene. Also, rendering the simulated scene is more realistic by accurately occluding objects "behind" the mesh. For example, the simulation module 220 occludes a tree if an agent is in the foreground. In this way, the learning system 170 uses meshing for a realistic representation of a scene during rendering.

In one approach, the learning system 170 renders a simulated scene by placing the mesh using a relative transform between corresponding agents and a viewpoint of an ego vehicle. The rendering may involve lighting adjustments where the learning system 170 casts ambient and directional light within a 3D view. Here, the ambient light may be associated with an average color of the 3D scene. The directional light can be factored from an ego viewpoint at an infinite distance.

Still referring to FIG. 3, a policy stage 350 processes the visual observations 340 from the scene simulator. Although a reinforcement model is used for training the simulation and learning stage 310, any learning model that estimates losses may be used for the training. Here, policy learning for the scene simulator involves the learning system 170 executing following and overtaking tasks by multiple agents. For example, the following and overtaking tasks involve an ego vehicle and an ado vehicle operating in automated mode. In one approach, the learning system 170 randomly initializes the ado vehicle at a distance along the forward direction of the ego vehicle. The ado vehicle may have a random speed, lateral shift, and heading for a given road curvature. In vehicle following, the task of the automated vehicle involves keeping tracking of the ado vehicle even through state changes (e.g., lane change). The ego vehicle travels at a random velocity to maintain the ado vehicle within a viewpoint for sufficient tracking.

Moreover, the ego vehicle in an overtaking task travels at a random velocity greater than the ado vehicle. This approach enables an overtaking action between the vehicles. In vehicle overtaking, the task of the automated vehicle involves passing the ado vehicle without a collision while maintaining lane stability. In one approach, the ado car in both tasks uses a pursuit controller that automatically traces trajectories according to road curvature while the ego vehicle commands steering. In this way, the learning involves realistic driving scenarios for training the scene simulator.

For end-to-end learning, the learning system 170 can use a RL problem that factors environmental dynamics, terminal conditions, and a reward function. Here, the scene simulator can define scene dynamics and evolution after receiving an agent action. Terminal conditions may involve exceeding a threshold maximum for path translation, rotation, and so on. Another terminal condition is a collision among agents.

Moreover, the simulation module 220 can determine a collision according to polygons overlapping with shape as a vehicle dimension. As such, a collision occurs when the vehicle dimension exceeds a threshold value. Furthermore, a reward function can factor rotational, lateral, and longitudinal components for a vehicle pose relative to the data (e.g., center line). Equation (3) expresses the following:

$$\begin{bmatrix} q_{lat} \\ q_{long} \\ q_{rot} \end{bmatrix} = \begin{bmatrix} \cos\theta_s & -\sin\theta_s & 0 \\ \sin\theta_s & \cos\theta_s & 0 \\ 0 & 0 & 1 \end{bmatrix} \begin{bmatrix} x_t - x_s \\ y_t - y_s \\ \theta_t - \theta_s \end{bmatrix}, \quad \text{Equation (3)}$$

where ($x_t$, $y_t$, $\theta_t$) and ($x_s$, $y_s$, $\theta_s$) are the poses of the virtual agent and a corresponding human reference, respectively. In Equation (3), terminal conditions previously described can be written as $\mathbb{1}_{q_{lat}>z_{lat}}$, and $\mathbb{1}_{q_{rot}>z_{rot}}$, where Z* is the threshold that triggers termination. Accordingly, a lane-following reward R can be:

$$R_{lane} = 1 - \left(\frac{q_{lat}}{Z_{lat}}\right)^2. \quad \text{Equation (4)}$$

Regarding vehicle following, the learning model may adapt the lane reward by changing the center line to the trajectory traced out by the ado or front vehicle *f*. In overtaking, a lane and pass reward are computed by comparing the distances traced out by both cars, $$R_{pass} = \mathbb{1}\left[\int \sqrt{\dot{x}_e(t) + \dot{y}_e(t)} - \int \sqrt{\dot{x}_f(t) + \dot{y}_f(t)} \geq Z_{pass}\right]. \quad \text{Equation (5)}$$

In Equation (5), subscripts $*_e$ and $*_f$ denote ego and front vehicles, respectively. Furthermore, $Z_{pass}$ is a hyperparameter used by the learning system 170 to control the training process of the scene simulator.

The learning system 170 also incorporates collision avoidance for training. For example, the learning system 170 dilates the ego car polygons and computes overlap with other agents as follows:

$$R_{collision} = -\frac{|Dilate(P_{ego}) \cap P_{other}|}{|P_{ego}|}. \quad \text{Equation (6)}$$

In Equation (6), P denotes polygons associated with a vehicle. In one approach, a comfort reward is factored to improve training. For example, a comfort reward is the negative second derivative of steering $R_{comfort}=-\ddot{\delta}$. In one approach, the learning system 170 uses the comfort reward to reduce motion jitter during simulation.

In various implementations, the learning system 170 uses the RL problem for proximal policy optimization (PPO). Through PPO, maximizing an objective can follow:

$$\mathbb{E}_{s,a\sim\pi_k}\left[\min\left(\frac{\pi_{k-1}(a \mid s)}{\pi_k(a \mid s)} A^{\pi_k}(a \mid s), \; clip\left(\frac{\pi_{k-1}(a \mid s)}{\pi_k(a \mid s)}, 1-\varepsilon, 1+\varepsilon\right) A^{\pi_k}(a \mid s)\right)\right]. \quad \text{Equation (7)}$$

In Equation (7), $\pi(a|s)$ is the distribution of policy action given observations s. $A^{\pi_k}(a|s)$ are advantage function estimates for action quality and E is a hyperparameter. Task performance can be maximized according to the advantage function while factoring policy. For example, the learning system 170 maximizes task performance by minimizing deviation between a new policy $\pi_k$ and an old policy $\pi_{k-1}$. The deviation may be bounded by keeping the ratio $\pi_{k-1}/\pi_k$ to a small interval, $\varepsilon$.

Referring again to the policy stage 350, the simulation and learning stage 310 takes visual observations s as images and outputs action a (e.g., steering angle). In one approach, a convolutional neural network (CNN) extracts image features and a long short-term memory (LSTM) recurrent network captures motion information of multiple agents within the scene. Through Equations (4)-(6), the learning system 170 rewards and penalizes various tasks for tuning the scene simulator. For example, a positive award is given for an ego vehicle staying in a lane and avoiding an obstacle during automated mode. The reward may be increased if smoothness and comfort are maintained by the ego vehicle. Conversely, a reward can be decreased for a collision within the simulated scene. Furthermore, the learning system 170 can compound, combine, weigh factors, and so on to form one reward value for training the scene simulator.

Moreover, the simulation state 330 iteratively calculates rewards and controls signals from the policy stage 350. The iterations improve the prediction of simulated scenes frame-by-frame. Here, a control signal is a numerical steering angle, a throttle amount, and so on. In conjunction, the policy stage 350 maximizes rewards of trajectories for vehicles within a simulated scene. In this way, the scene simulator is improved through adjustments.

Figure 4:
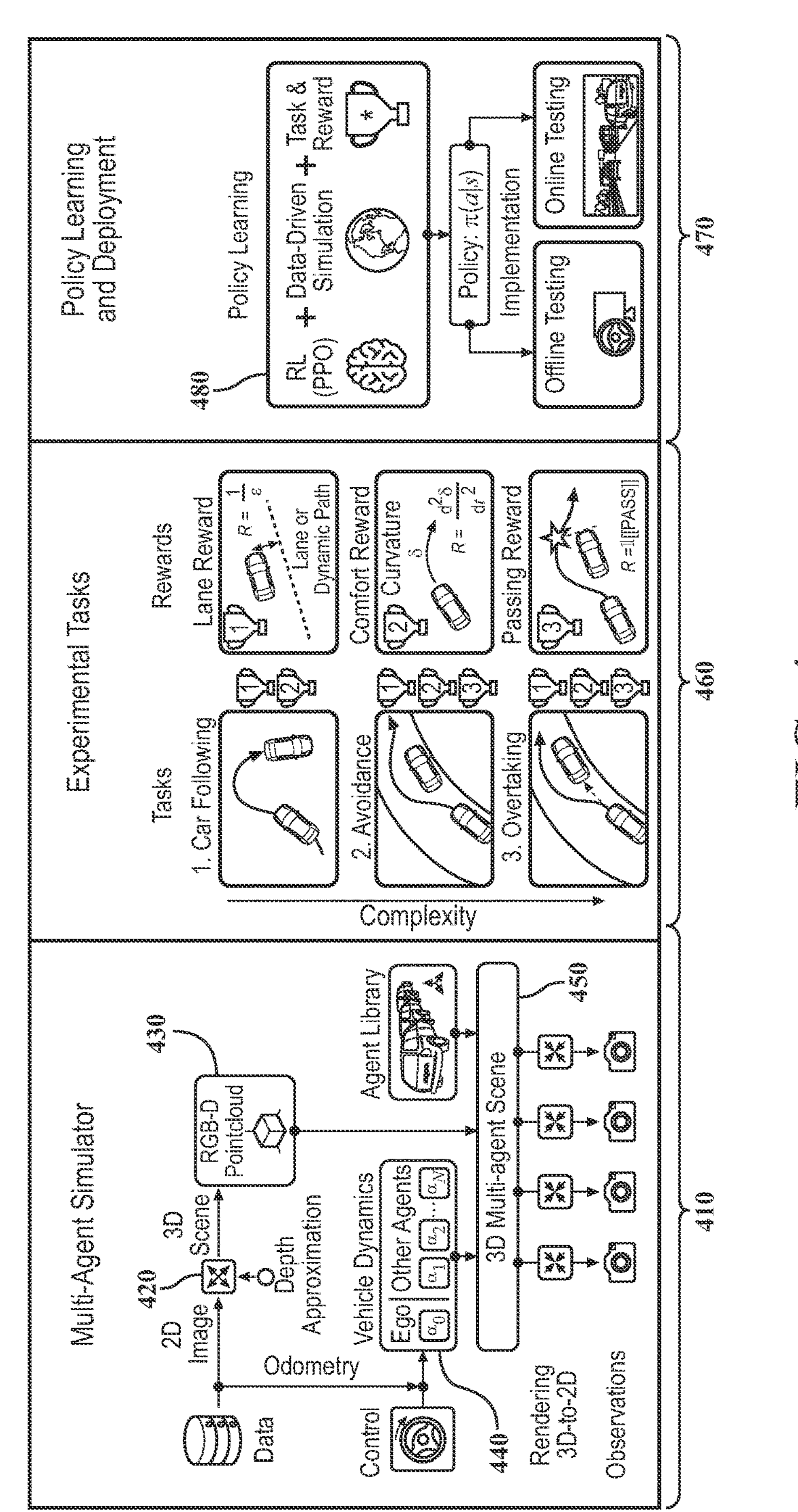
FIG. 4 illustrates one embodiment of a learning system training and implementing a scene simulator using a RL model.

Turning now to FIG. 4, one embodiment of the learning system 170 training and implementing a scene simulator 400 using RL is illustrated. Here, the learning system 170 reduces minimum data quantities and learns transferable learning models by leveraging photo-realistic simulations. In particular, the learning system 170 may train the multi-agent simulator 410 to render realistic scenes using 2D images and odometry data from real vehicles. The image computation at 420 uses depth approximations to convert the 2D images into a 3D scene. The learning system 170 then computes a red/green/blue depth (RGB-D) point cloud 430 from the 3D scenes, thereby forming a 3D space.

As previously explained, the simulation module 220 can estimate vehicle dynamics 440 for multiple agents using odometry data and control signals. The learning system 170 computes a 3D multi-agent scene 450 using the vehicle dynamics 440 and the RGB-D point cloud 430. Furthermore, an agent library including 2D/3D images of multiple agent interactions improves training by filling gaps in the trace data. Here, inpainting may also be utilized to estimate colors of missing pixels caused by occlusions or anomalies. As such, the simulation module 220 renders 2D scenes and composes observations involving interactions of multiple agents.

Moreover, the learning system 170 performs the experimental tasks 460 using outputs from the multi-agent simulator 410 for training and end-to-end learning. As previously explained, tasks vary in complexity including vehicle following, object avoidance, and vehicle overtaking. Here, the learning system 170 can compute a reward for different tasks using various models, such as Equations (4)-(6). As such, policy learning and deployment 470 applies the rewards to improve scene simulations. In particular, the policy learning 480 uses PPO, real and simulated data, and rewards to develop $\pi(a|s)$. Given observations s, $\pi(a|s)$ represents a distribution of policy action for steering values, throttle values, and so on. In this way, the learning system 170 improves realism of the scene simulator using a diverse dataset and a RL problem.

Regarding further testing, the learning system 170 may apply online and offline active testing before fully implementing the scene simulator. Online tests run control policies end-to-end on a real automated vehicle. An offline test executes policies in the scene simulator. Active testing (i.e., closed-loop) involves policies taking action and interacting with the environment for the evaluation. Passive (i.e., open-loop) testing involves computing a difference from a control command pre-collected. Furthermore, testing performance of end-to-end policies can consider tradeoffs between safety and stability. For a safety metric, the learning system 170 can factor an intervention rate during automated mode. For example, an overlap of agents more than zero can be an intervention factor in an offline test. In an online test, the intervention involves a vehicle takeover by an operator. An additional safety metric is a minimal clearance that estimates the shortest distance between polygons representing agents through a driving scenario.

Moreover, stability metrics may measure the performance of a policy to maneuver through lanes during overtaking. As previously explained, the learning system 170 can compute the maximal deviation and significant lateral shifts from the lane center through a driving scenario. Another computation is maximal yaw defined as the greatest yaw difference from a road curvature. In one approach, the deviation is compared to a ground truth for maneuvers in similar scenarios involving multiple agents. Accordingly, the learning system 170 can implement these stability metrics to improve controls from the policy stage 350, thereby reducing training times.

Figure 5:
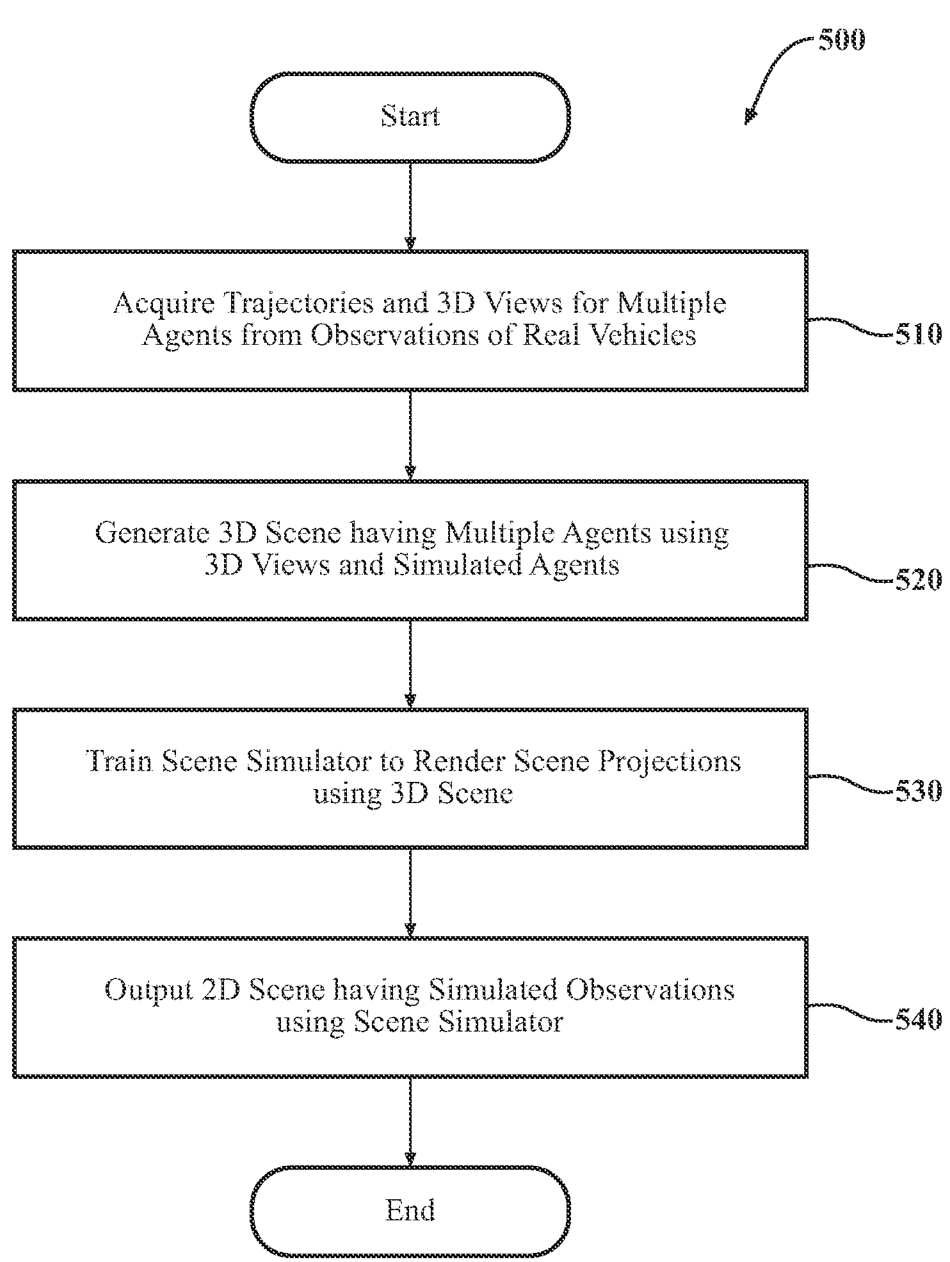
FIG. 5 illustrates one embodiment of a method that is associated with training the scene simulator using real vehicle data to generate realistic scenes.

Turning now to FIG. 5, a flowchart of a method 500 that is associated with training the scene simulator using real vehicle data to generate realistic scenes is illustrated. Method 500 will be discussed from the perspective of the learning system 170 of FIGS. 1 and 2. While method 500 is discussed in combination with the learning system 170, it should be appreciated that the method 500 is not limited to being implemented within the learning system 170 but is instead one example of a system that may implement the method 500.

At 510, the learning system 170 acquires trajectories and 3D views for multiple agents from observations of real vehicles. Here, the learning system 170 uses data-driven training through real odometry, 2D image, and depth information. In one approach, the observations include trace data (e.g., real images, steering angles, position, velocity, etc.) from a fleet having multiple agent interactions. Trace data allows training through real videos from a diverse crowd of monocular cameras, stereo cameras, perception sensors, and so on. The trace data may provide the learning system 170 trajectory samples from real-world perception. As previously explained, the scene simulator trains using the trace data for synthesizing photo-realistic and semantically accurate local-views on a frame-by-frame basis.

At 520, the learning system 170 generates a 3D scene having multiple agents using 3D views and data from simulated agents. Here, the learning system 170 uses a multi-agent library having 2D/3D images of virtual agents that encountered multiple agent interactions. In one approach, a reconstruction engine fills gaps in the trace data using the multi-agent library. Furthermore, the learning system 170 computes a simulation state utilizing the simulation data 250 and constructs a simulated scene through visual observations. In particular, the visual observations include projected trajectories for the multiple agents within the simulated scene. As previously explained, the learning system 170 forms the projected trajectories using a model for vehicle dynamics.

Moreover, the learning system 170 can represent an agent using a mesh body for the visual observations. Meshing allows flexible positioning of the multiple agents within the simulated scene. Also, the simulated scene is rendered such that objects “behind” the mesh are accurately occluded, thereby improving realism. As such, the simulation module 220 may sample a library of vehicle meshes that are parameterized according to attributes during rendering. Here, parameterization can improve realism by increasing sampling accuracy.

At 530, the learning system 170 trains a scene simulator to render scene projections using the 3D scene. In one approach, the learning system 170 derives a RL problem for end-to-end learning using a 2D scene. For example, the RL problem factors environmental dynamics, terminal conditions, and a reward function. Here, the scene simulator calculates object motion and dynamics after receiving an agent action. In one approach, driving scenarios for the RL problem may include vehicle following, object avoidance, and vehicle overtaking. Furthermore, terminal conditions may involve exceeding a threshold maximum for path features (e.g., translation, rotation, etc.) and collisions for driving scenarios. Regarding the reward function, the RL problem can factor rotational, lateral, and longitudinal components for a vehicle pose relative to a center line, boundary, and so on. These factors may determine a reward for a simulated maneuver used to train the scene simulator.

In various implementations, the simulation module 220 projects a collision according to polygons overlapping within vehicle dimensions. As such, a collision occurs when the vehicle dimension exceeds a threshold value. In this way, the simulation module 220 accurately represents scenarios that improves training of the scene simulator with the RL problem.

Moreover, a policy stage can be utilized for the end-to-end learning. Here, the learning system 170 makes visual observations of a simulated scene and outputs an action (e.g., steering angle). As previously explained, a CNN can extract image features and a LS™ recurrent network can capture motion information of multiple agents. As such, the learning system 170 rewards and penalizes various tasks for tuning the scene simulator from observed actions. For example, the learning system 170 gives a positive award to an ego vehicle avoiding an object during automated mode. The reward is increased if smoothness and comfort are maintained by the ego vehicle during the maneuvering. Conversely, the learning system 170 decreases a reward for a collision within the simulated scene.

In one approach, the learning system 170 iteratively trains the scene simulator through various states and image frames. In particular, simulation states are adapted using calculated rewards and control signals from the policy stage. Here, a control signal is a numerical steering angle, a throttle amount, and so on. Adapting the simulation states in the RL model improves frame-by-frame prediction of simulated scenes.

At 540, the learning system 170 outputs a 2D scene having simulated observations using the scene simulator. As previously explained, the learning system 170 estimates a 2D scene from the 3D scene having multiple agents for task processing. In one approach, this process may involve inpainting to estimate colors of missing pixels from occlusions or anomalies for improved realism. Here, the learning system 170 can use the 2D scene having realistic agent interactions to derive visual observations for further training or implementation. Accordingly, the learning system 170 improves simulations for multiple agent interactions using fleet and library data in a RL model, thereby reducing costs and improving realism.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the learning system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the learning system 170, and/or the automated driving module(s) 160 may control some or all of the vehicle systems 140 and, thus, may be partially or fully autonomous as defined by the society of automotive engineers (SAE) levels 0 to 5.

The processor(s) 110, the learning system 170, and/or the automated driving module(s) 160 can be operatively connected to communicate with the various vehicle systems 140 and/or individual components thereof. For example, returning to FIG. 1, the processor(s) 110, the learning system 170, and/or the automated driving module(s) 160 can be in communication to send and/or receive information from the various vehicle systems 140 to control the movement of the vehicle 100. The processor(s) 110, the learning system 170, and/or the automated driving module(s) 160 may control some or all of the vehicle systems 140.

The processor(s) 110, the learning system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the learning system 170, and/or the automated driving module(s) 160 can control the direction and/or speed of the vehicle 100. The processor(s) 110, the learning system 170, and/or the automated driving module(s) 160 can cause the vehicle 100 to accelerate, decelerate, and/or change direction. As used herein, “cause” or “causing” means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the learning system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 260. “Driving maneuver” means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, “cause” or “causing” means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A learning system, comprising:

a processor; and a memory storing instructions that, when executed by the processor, cause the processor to:

acquire trajectories and three-dimensional (3D) views for multiple agents from observations of real vehicles;

generate a 3D scene having the multiple agents by casting ambient light within the 3D views to the real vehicles associated with an infinite distance with the multiple agents and information from simulated agents, wherein the ambient light is associated with an average color of the 3D scene;

train a scene simulator with a policy to render scene projections using the 3D scene with a foreground mask, and a reinforcement model computes the policy and increases a reward for a driving task associated with an ego vehicle within a driving scene that is using the policy; and output a 2D scene having simulated observations for the driving scene using the scene simulator.

2. The learning system of claim 1, further including instructions to:

compute, by the reinforcement model, the reward for the driving task using a simulated scene estimated by the scene simulator;

form the policy that increases the reward, wherein the reinforcement model outputs a control signal for an ego vehicle within the driving scene using the policy; and train the scene simulator according to the policy.

3. The learning system of claim 2, wherein the instructions to compute the reward further include instructions to:

compose the simulated scene using representations of visual observations for a driving scenario, wherein the visual observations are associated with data from an ego vehicle and represent a simulated state.

4. The learning system of claim 2, wherein the control signal is one of a steering angle and a throttle amount and the driving task is one of vehicle following, avoidance, and overtaking a vehicle.

5. The learning system of claim 2, further including instructions to increase the reward in response to a vehicle avoiding an object or tracking a lane during a driving scenario.

6. The learning system of claim 1, wherein the instructions to generate the 3D scene further include instructions to:

cast directional light within the 3D views according to the real vehicles; and process the 3D scene with the 3D views and the foreground mask to further train the scene simulator.

7. The learning system of claim 1, further including instructions to:

select vehicle bodies for the multiple agents randomly from a mesh library; and mesh the vehicle bodies of the multiple agents for the 3D scene using distances between the multiple agents.

8. The learning system of claim 7, further including instructions to:

transform the vehicle bodies in the 3D scene to determine collisions between the multiple agents; and train the scene simulator according to the collisions for estimating 2D views.

9. A non-transitory computer-readable medium comprising: instructions that when executed by a processor cause the processor to:

acquire trajectories and three-dimensional (3D) views for multiple agents from observations of real vehicles;

generate a 3D scene having the multiple agents by casting ambient light within the 3D views to the real vehicles associated with an infinite distance with the multiple agents and information from simulated agents, wherein the ambient light is associated with an average color of the 3D scene;

train a scene simulator with a policy to render scene projections using the 3D scene with a foreground mask, and a reinforcement model computes the policy and increases a reward for a driving task associated with an ego vehicle within a driving scene that is using the policy; and output a 2D scene having simulated observations for the driving scene using the scene simulator.

10. The non-transitory computer-readable medium of claim 9, further including instructions to:

compute, by the reinforcement model, the reward for the driving task using a simulated scene estimated by the scene simulator;

form the policy that increases the reward, wherein the reinforcement model outputs a control signal for an ego vehicle within the driving scene using the policy; and train the scene simulator according to the policy.

11. The non-transitory computer-readable medium of claim 10, wherein the instructions to compute the reward further include instructions to:

compose the simulated scene using representations of visual observations for a driving scenario, wherein the visual observations are associated with data from an ego vehicle and represent a simulated state.

12. The non-transitory computer-readable medium of claim 10, wherein the instructions to generate the 3D scene further include instructions to:

cast directional light within the 3D views according to the real vehicles; and process the 3D scene with the 3D views and the foreground mask to further train the scene simulator.

13. A method comprising:

acquiring trajectories and three-dimensional (3D) views for multiple agents from observations of real vehicles;

generating a 3D scene having the multiple agents by casting ambient light within the 3D views to the real vehicles associated with an infinite distance with the multiple agents and information from simulated agents, wherein the ambient light is associated with an average color of the 3D scene;

training a scene simulator with a policy to render scene projections using the 3D scene with a foreground mask, and a reinforcement model computes the policy and increases a reward for a driving task associated with an ego vehicle within a driving scene that is using the policy; and outputting a 2D scene having simulated observations for the driving scene using the scene simulator.

14. The method of claim 13, further comprising:

computing, by the reinforcement model, the reward for the driving task using a simulated scene estimated by the scene simulator;

forming the policy that increases the reward, wherein the reinforcement model outputs a control signal for an ego vehicle within the driving scene using the policy; and training the scene simulator according to the policy.

15. The method of claim 14, wherein computing the reward further includes:

composing the simulated scene using representations of visual observations for a driving scenario, wherein the visual observations are associated with data from an ego vehicle and represent a simulated state.

16. The method of claim 14, wherein the control signal is one of a steering angle and a throttle amount and the driving task is one of vehicle following, avoidance, and overtaking a vehicle.

17. The method of claim 14, further comprising:

increasing the reward in response to a vehicle avoiding an object or tracking a lane during a driving scenario.

18. The method of claim 13, wherein generating the 3D scene further includes:

casting directional light within the 3D views according to the real vehicles; and processing the 3D scene with the 3D views and the foreground mask to further train the scene simulator.

19. The method of claim 13, further comprising:

selecting vehicle bodies for the multiple agents randomly from a mesh library; and meshing the vehicle bodies of the multiple agents for the 3D scene using distances between the multiple agents.

20. The method of claim 19, further comprising:

transforming the vehicle bodies in the 3D scene to determine collisions between the multiple agents; and training the scene simulator according to the collisions for estimating 2D views.

* * * * *